(12) United States Patent
Lin

(10) Patent No.: US 8,531,437 B2
(45) Date of Patent: Sep. 10, 2013

(54) HANDWRITING INPUT SYSTEM

(75) Inventor: Tsung-Yu Lin, Taipei Hsien (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 853 days.

(21) Appl. No.: 12/713,294

(22) Filed: Feb. 26, 2010

(65) Prior Publication Data

US 2011/0100730 A1    May 5, 2011

(30) Foreign Application Priority Data

Nov. 4, 2009 (CN) .......................... 2009 1 0309274

(51) Int. Cl.
*G06F 3/033* (2013.01)

(52) U.S. Cl.
USPC ........................................ 345/179; 178/19.05

(58) Field of Classification Search
USPC ............... 345/173–183; 178/18.01–18.09, 178/19.01–19.07; 401/195
See application file for complete search history.

(56) References Cited

U.S. PATENT DOCUMENTS

| | | | | |
|---|---|---|---|---|
| 5,239,373 A * | 8/1993 | Tang et al. | ................. | 348/14.01 |
| 6,441,362 B1 * | 8/2002 | Ogawa | .......................... | 250/221 |
| 6,567,078 B2 * | 5/2003 | Ogawa | .......................... | 345/179 |
| 6,654,008 B2 * | 11/2003 | Ikeda et al. | ..................... | 345/179 |
| 6,707,444 B1 * | 3/2004 | Hendriks et al. | ............... | 345/156 |
| 7,136,053 B2 * | 11/2006 | Hendriks et al. | ............... | 345/179 |
| 7,227,539 B2 * | 6/2007 | Chou | ............................ | 345/179 |
| 8,081,171 B2 * | 12/2011 | Adams et al. | ................. | 345/179 |
| 8,454,257 B2 * | 6/2013 | Lin | ............................... | 401/195 |

FOREIGN PATENT DOCUMENTS

CN          201072536 Y        6/2008

* cited by examiner

*Primary Examiner* — Vijay Shankar
(74) *Attorney, Agent, or Firm* — Altis Law Group, Inc.

(57) ABSTRACT

A handwriting input system includes a handwriting input device, a visible light sensing member, an infrared sensing member, and a receiving member. The handwriting input device includes a writing head and an infrared light source adjacent to the writing head. The writing head is capable of leaving color distinguishable traces on an object. The visible light sensing member is configured for capturing images of handwriting traces. The infrared sensing member is configured for capturing images of movement track of the infrared light source. The visible light sensing member and the infrared sensing member are slidably installed on the receiving member.

15 Claims, 4 Drawing Sheets

HANDWRITING INPUT SYSTEM

BACKGROUND

1. Technical Field

The present disclosure relates to a handwriting input system.

2. Description of Related Art

The development of information and communications technology has spawned must-have information input-enabled electronic devices handling for example, special character input.

Information input modes include keyboard, voice, and handwriting input. A typical handwriting input device includes a panel and a stylus. A number of resistors or capacitors are installed in the panel. When the stylus touches the panel, resistances/capacitances of some resistors/capacitors are changed. A stylus position on the stylus board is sensed according to the changes of the resistances/capacitances of the resistors/capacitors. Accordingly, paths of movement of the stylus are determined thus achieving a handwriting function.

However, the written information, which is convertible to hardcopy and/or printable format, if inadvertently lost or deleted, is irretrievable as it is stored in memory.

Therefore, a handwriting input system overcoming the above-described shortcomings is needed.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
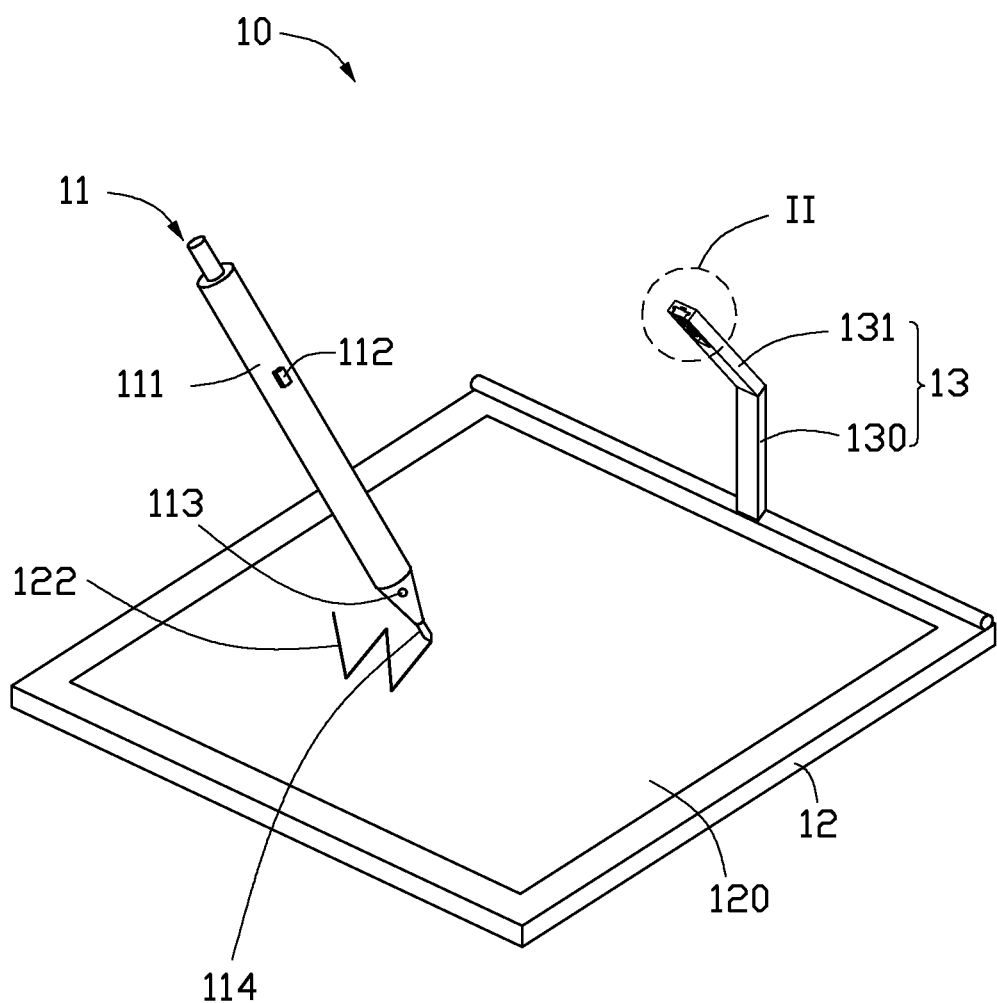
FIG. 1 is a schematic, isometric view of an exemplary embodiment of a handwriting input and image capture system, which includes a handwriting input device.

Referring to FIG. 1, a handwriting input system 10 according to an exemplary embodiment includes a handwriting input device 11, a writing board 12 and an image capture device 13. The object of the system 10 is to allow a user to write in traditional manner such as with pen and ink on paper while at the same time storing the writing in electronic form in a device such as a computer.

The handwriting input device 11 includes a penholder 111, a switch button 112, an infrared (IR) light source 113, and a writing head 114. The IR light source 113 is fixed adjacent to the writing head 114. The switch button 112 is installed in, and extends out of the outer surface of the penholder 111. The switch button 112 is an on/off control for the IR light source 113. The writing head 114 of the handwriting input device 111 is capable of leaving solid or liquid color-distinguishable material, such as ink, on a writing surface. A color of the solid or liquid color-distinguishable material may be, for example, red, green, blue etc. Because the IR light source 113 is positioned close to the writing head 114, the movement track of the handwriting input device 11 is generally identical to the ink traces left on the paper or writing board 12 by the writing head 114.

The board 12 is a flat board for placement of a handwriting recording object such as paper or other media. The handwriting traces recording object is configured for recording solid or liquid material outflowing from the writing head 114. As shown in FIG. 1, a handwriting trace 122 is formed by the solid or liquid material outflowing from the handwriting head 114. In the illustrated embodiment, the handwriting traces recording object is writing paper 120.

The switch button 112 also serves as a press-type switch. Accordingly, switching on/off of the IR light source 113 is realized by pressing and releasing the switch button 112. When the writing head 114 is pressed to the writing paper 120, the IR light source 113 emits IR light. When the writing head 114 withdraws from the writing paper 120, the IR light source 113 switches to an off state. Therefore, when using the handwriting input device 11 on the writing paper 120, the image capture device 13 can pick up the movement track of the handwriting input device 11. Thus, the captured handwriting track will at least generally correspond to the ink traces on the writing paper 120.

Figure 2:
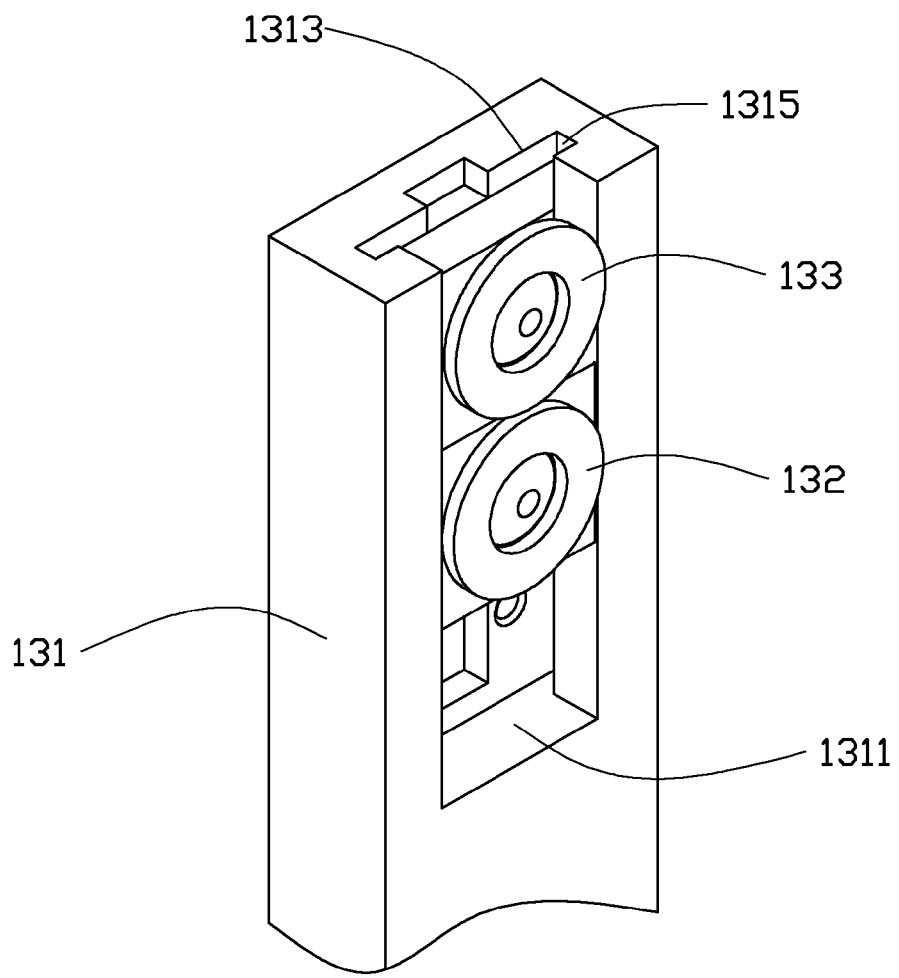
FIG. 2 is a schematic, isometric view enlarging a portion II of an image capture device in the handwriting input and image capture system shown in FIG. 1.
Figure 3:
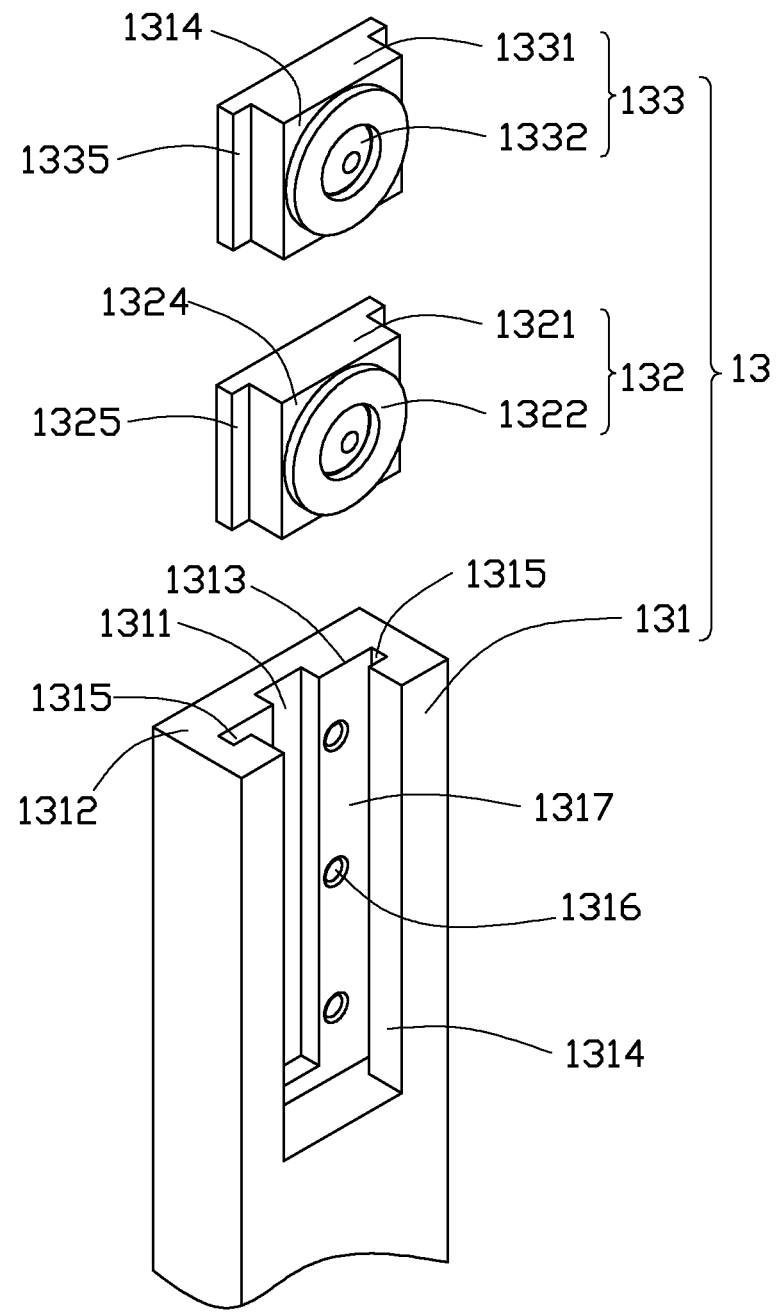
FIG. 3 is a schematic, disassembled isometric view of portion II of the image capture device in the handwriting input and image capture system shown in FIG. 1.
Figure 4:
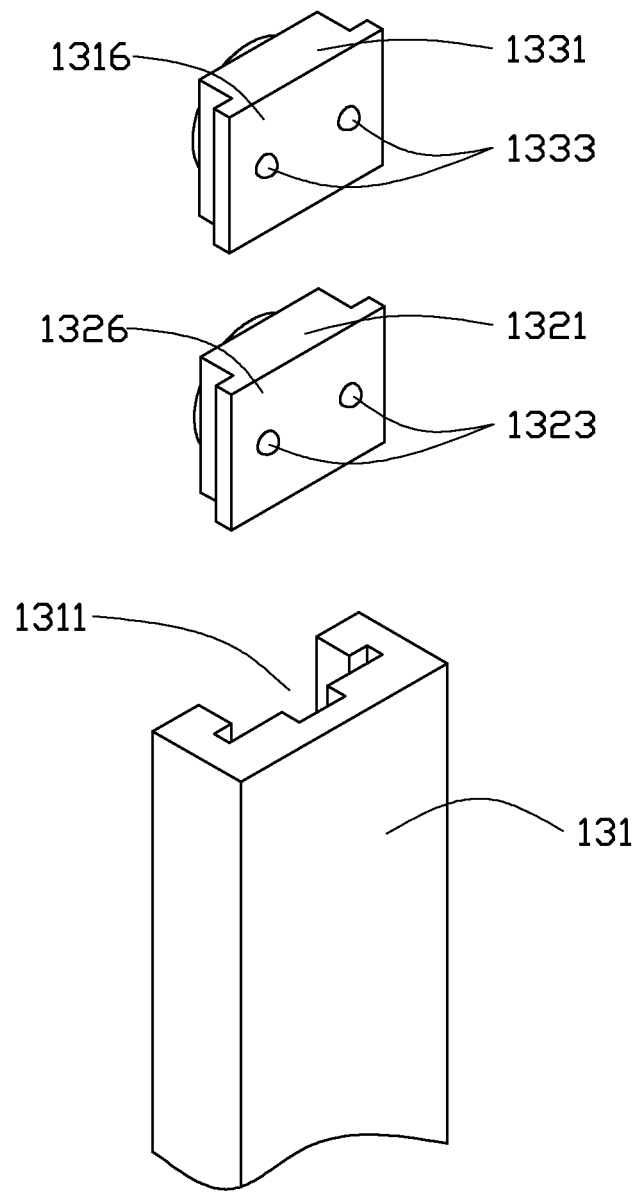
FIG. 4 is a similar to FIG. 3, but viewed from a different angle.

Referring also to FIGS. 2-4, the image capture device 13 includes an installing board 130, a receiving member 131, an IR light sensing member 132, and a visible light sensing member 133. The installing board 130 is fixed on one edge of the board 12. The receiving member 131 is connected to one end of the installing board 130, and configured for receiving the IR light sensing member 132 and the visible light sensing member 133.

The IR light sensing member 132 includes a first base 1321 and an IR light capture module 1322. The first base 1321 has a general cuboid shape. The IR light capture module 1322 is installed in a front surface 1324 of the first base 1321. The IR light capture module 1322 is configured for capturing IR light emitted from the IR light source 113 and recording a movement track of the IR light source 113. The IR light capture module 1322 can be electrically connected to a personal computer, personal digital assistant, mobile phone, or other electronic device for displaying the movement track of the IR light source 113. Two flange portions 1325 protrude from two opposite side faces of the first base 132 adjacent to the front surface 1324, respectively. Two convex portions 1323 are formed on a back surface 1326 of the first base 1321 facing away from the front surface 1324.

The visible light sensing member 133 includes a second base 1331 and an visible light capture module 1332. The second base 1331 is similar in size and structure to the first base 1321. The visible light capture module 1332 is installed in a front surface 1334 of the second base 1331. Two convex portions 1333 are formed on a back surface 1336 of the second base 1331. Positions of the two convex portions 1333 on the back surface 1336 correspond to those of the two convex 1323 on the back surface 1326. Two flange portions 1335 protrude from two opposite side faces of the second base 133 adjacent to the front and back surfaces 1334, 1336 of the second base 133, respectively.

The receiving member 131 has an elongated shape. A sliding hole 1311 is defined along an extension direction of the receiving member 131. The sliding hole 1311 extends through an end surface 1312 of the receiving member 131, thereby forming an opening 1313 at the end surface of the receiving member 131. An elongated recess 1314 is formed in a surface of the receiving member 131. The elongated recess 1314 extends parallel to and is in communication with the extension direction of sliding hole 1311. The elongated recess 1314 has a width lower than that of the sliding hole 1311, thereby forming two sliding slots 1315 extending along the sliding hole 1311. Three sets of two concave portions 1316 are formed in a surface 1317 of the receiving member 131 in the sliding hole 1311 facing the elongated recess 1314. From the viewing angle of FIG. 3, just one concave portion 1316 of one set of the two concave portions 1316 can be seen. The three sets of two concave portions 1316 are aligned with each other along the extension direction of the sliding hole 1311. Positions of the two concave portions 1316 correspond to those of the two convex portions 1333. A distance between the two concave portions 1316 is substantially equal to that of the two convex portions 1323 or between the two convex portions 1333. The two concave portions 1316 are configured for receiving the two convex portions 1323 or the two convex portions 1333, thereby positioning the infrared sensing member 132 and the visible light sensing member 133 partly in the sliding hole 1311.

The IR light sensing member 132 and the visible light sensing member 134 are assembled to the receiving member 131 from the opening 1313 at the end surface of the receiving member 131. One of the two flange portions 1325 and one of the two flange portions 1335 are slidably engaged in one of the two sliding slots 1315 along the extension direction of the sliding slot 1315. The other flange portion 1325 and the other flange portion 1335 are slidably engaged in the other sliding slot 1315 along the extension direction of the sliding slot 1315. When the IR light sensing member 132 slides to a position in that the two convex portions 1323 are accommodated in two concave portions 1316 of one set, respectively, the IR light sensing member 132 is fixed in a position in the receiving member 131. Similarly, the visible light sensing member 133 can be fixed in a position in the receiving member 131 in that the convex portions 1333 are accommodated in two concave portions 1316 of one set, respectively. The IR light capture module 1322 and the visible light capture module 1332 are exposed to the exterior from the elongated recess 1314. As illustrated in FIG. 2, the IR light sensing member 132 and the visible light sensing member 133 abut against each other adjacent to the opening 1313. The receiving member 131 is flexible enough such that the IR light sensing member 132 can be moved away from the opening 1313 along the sliding slots 1315 until the two convex portions 1323 are accommodated in two concave portions 1316 of the set far from the opening 1313. In that case, the visible light sensing member 133 can also be moved away from the opening 1313 to an original position of the IR light sensing member 132.

When positions of the IR light sensing member 132 and the visible light sensing member 133 are changed in sliding in the sliding slots 1315, a viewing field of the IR light sensing member 132 and a viewing field of the visible light sensing member 133 can be changed. Thus, the viewing fields of the IR light sensing member 132 and the visible light sensing member 133 can reach different fields of the writing paper 120.

When the IR light source 113 is in an off state, ink traces left on the writing paper 120 by the writing head 114 are captured by the visible light sensing member 133. When the IR light source 113 is in an on state, the movement track of the handwriting input device 11 is captured by the IR light sensing member 132. At the same time, the ink traces left on the writing paper 120 can be captured by the visible light sensing member 133. The ink traces and the movement track of the handwriting input device 11 captured can be sent to an electronic device, such as a personal computer, a personal assistant, or a mobile phone, for storing or displaying.

In this embodiment, the ink traces can be left on the writing paper 120 and movement tracks can also be recorded. Therefore, both paper and electronic files about the movement of the handwriting input device 11 can be recorded.

It is to be understood that the above-described embodiment is intended to illustrate rather than limit the embodiments. Variations may be made to the embodiment without departing from the spirit of the invention as claimed. The above-described embodiments are intended to illustrate the scope of the invention and not restrict the scope of the embodiments.

What is claimed is:

1. A handwriting input system, comprising: a handwriting input device comprising a penholder, a writing head adjacent to one end of the penholder and an infrared light source fixed to the penholder adjacent to the writing head, the writing head capable of leaving color distinguishable traces on an object; a visible light sensing member configured for capturing images of the color distinguishable traces; an infrared light sensing member configured for capturing images of movement track of the infrared light source; and a receiving member, the visible light sensing member and the infrared light sensing member slidably installed on the receiving member; wherein the receiving member comprises two parallel sliding slots facing toward each other, the IR light sensing member comprises two first flange portions at opposite sides thereof, the two first flange portions slidably accommodated in the two parallel sliding slots, respectively, the IR light sensing member exposed to an exterior and facing toward a writing board.

2. The handwriting input system of claim 1, further comprising a writing board, the receiving member fixed on the writing board.

3. The handwriting input system of claim 2, further comprising an installing board fixed on one edge of the writing board, the receiving member connected to one end of the installing board.

4. The handwriting input system of claim 1, wherein the visible light sensing member comprises two second flange portions at opposite sides thereof, the two second flange portions slidably accommodated in the two sliding slots, respectively, the visible light sensing member exposed to the exterior and facing toward the writing board.

5. The handwriting input system of claim 4, wherein the IR light sensing member further comprises a first convex portion on a back surface thereof, the visible light sensing member further comprising a second convex portion on a back surface thereof, the receiving member further comprising three concave portions in a surface adjacent to the two sliding slots, the three concave portions aligned along a direction parallel to extension directions of the sliding slots, the concave portions configured for accommodating the first and second convex portions, thereby positioning the IR light sensing member and the visible light sensing member.

6. The handwriting input system of claim 1, further comprising a switch button configured for controlling switch-on/off of the infrared light source.

7. The handwriting input system of claim 1, further comprising a push switch for controlling switch-on/off of the infrared light source by pressing and releasing the writing head.

8. The handwriting input system of claim 1, wherein the receiving member has an elongated shape, a sliding hole defined along an extension direction of the receiving member, the sliding hole extending through an end surface of the receiving member, thereby forming an opening at the end surface of the receiving member, an elongated recess formed in a surface of the receiving member, the elongated recess extending parallel to and being in communication with the extension direction of sliding hole, the elongated recess having a width lower than that of the sliding hole, thereby forming the two sliding slots extending along the sliding hole.

9. A handwriting input system, comprising:
   a handwriting input device comprising a writing head and an infrared light source adjacent to the writing head, the writing head capable of leaving color distinguishable traces on an object;
   a visible light sensing member configured for capturing images of the color distinguishable traces;
   an infrared light sensing member configured for capturing images of movement track of the infrared light source; and
   a receiving member, the visible light sensing member and the infrared light sensing member slidably installed on the receiving member, the receiving member comprising two parallel sliding slots facing toward each other, the IR light sensing member comprising two first flange portions at opposite sides thereof, the two first flange portions slidably accommodated in the two sliding slots, respectively, the IR light sensing member exposed to an exterior and facing toward the writing board; and
   a writing board, the receiving member fixed on the writing board.

10. The handwriting input system of claim 9, further comprising an installing board fixed on one edge of the writing board, the receiving member connected to one end of the installing board.

11. The hand handwriting input system of claim 9, wherein the visible light sensing member comprises two second flange portions at opposite sides thereof, the two second flange portions slidably accommodated in the two sliding slots, respectively, the visible light sensing member exposed to the exterior and facing toward the writing board.

12. The handwriting input system of claim 11, wherein the IR light sensing member further comprises a first convex portion on a back surface thereof, the visible light sensing member further comprising a second convex portion on a back surface thereof, the receiving member further comprising three concave portions in a surface adjacent to the two sliding slots, the three concave portions aligned along a direction parallel to extension directions of the sliding slots, the concave portions configured for accommodating the first and second convex portions, thereby positioning the IR light sensing member and the visible light sensing member.

13. The handwriting input system of claim 9, further comprising a switch button configured for controlling switch-on/off of the infrared light source.

14. The handwriting input system of claim 9, further comprising a push switch for controlling switch-on/off of the infrared light source by pressing and releasing the writing head.

15. The handwriting input system of claim 9, wherein the receiving member has an elongated shape, a sliding hole defined along an extension direction of the receiving member, the sliding hole extending through an end surface of the receiving member, thereby forming an opening at the end surface of the receiving member, an elongated recess formed in a surface of the receiving member, the elongated recess extending parallel to and being in communication with the extension direction of sliding hole, the elongated recess having a width lower than that of the sliding hole, thereby forming the two sliding slots extending along the sliding hole.

* * * * *